(12) United States Patent
Xiong et al.

(10) Patent No.: US 8,299,727 B1
(45) Date of Patent: Oct. 30, 2012

(54) ANTI-ARCING PROTECTION CIRCUIT FOR AN ELECTRONIC BALLAST

(75) Inventors: Wei Xiong, Madison, AL (US); Christopher Radzinski, Huntsville, AL (US)

(73) Assignee: Universal Lighting Technologies, Inc., Madison, AL (US)

(*) Notice: Subject to any disclaimer, the term of this patent is extended or adjusted under 35 U.S.C. 154(b) by 485 days.

(21) Appl. No.: 12/648,922

(22) Filed: Dec. 29, 2009

Related U.S. Application Data

(60) Provisional application No. 61/177,564, filed on May 12, 2009.

(51) Int. Cl.
*G05F 1/00* (2006.01)

(52) U.S. Cl. ............... 315/299; 315/119; 315/209 R; 315/307

(58) Field of Classification Search .......... 315/119, 315/121, 125, 127, 128, 177, 200 R, 201, 315/206, 207, 209 R, 210, 219, 220, 224, 315/225, 226, 291, 294, 295, 297, 299, 306, 315/307, 308, 310, 311, 312, 313, 320, 360, 315/361, 363
See application file for complete search history.

(56) References Cited

U.S. PATENT DOCUMENTS

| | | | |
|---|---|---|---|
| 4,488,199 A | 12/1984 | Bloomer | |
| 5,008,598 A | 4/1991 | Cook, II | |
| 5,280,404 A | 1/1994 | Ragsdale | |
| 5,291,099 A | 3/1994 | Gill et al. | |
| 5,619,105 A | 4/1997 | Holmquest | |
| 5,770,926 A | 6/1998 | Choi et al. | |
| 6,023,132 A | 2/2000 | Crouse et al. | |
| 6,175,189 B1 | 1/2001 | Brooks | |
| 6,274,987 B1 | 8/2001 | Burke | |
| 6,292,339 B1 | 9/2001 | Brooks | |
| 6,720,739 B2 | 4/2004 | Konopka | |
| 6,809,483 B2 | 10/2004 | Alexandrov | |
| 7,042,161 B1 | 5/2006 | Konopka | |
| 7,102,297 B2 | 9/2006 | Trestman et al. | |
| 7,183,721 B2 | 2/2007 | Haque | |
| 7,312,588 B1 | 12/2007 | Yu et al. | |
| 2002/0113559 A1 | 8/2002 | Lam | |
| 2005/0046357 A1 | 3/2005 | Stack | |
| 2007/0029943 A1 | 2/2007 | Erhardt et al. | |

FOREIGN PATENT DOCUMENTS

| | | |
|---|---|---|
| JP | 2005158366 | 6/2005 |
| WO | 200209479 | 1/2002 |
| WO | 2008014632 | 2/2008 |

*Primary Examiner* — Douglas W Owens
*Assistant Examiner* — Jianzi Chen
(74) *Attorney, Agent, or Firm* — Waddey & Patterson, P.C.; Mark J. Patterson; Gary L. Montie

(57) ABSTRACT

An arc protection circuit is provided for a current-fed, parallel-resonant inverter ballast. The circuit includes a lamp current rate of change sensing circuit coupled with one or more lamps to detect a total lamp current; a ballast shutdown circuit to disable the ballast in response to a disturbance in the detected signal; a startup delay circuit, at least a portion of which defines a first time delay from a predetermined condition during which the ballast can not be disabled by the shutdown circuit; and an automatic restart circuit to enable restarting of the ballast, at least a portion of which defines a second time delay during which the ballast remains disabled, after which the ballast is restarted.

20 Claims, 6 Drawing Sheets

ANTI-ARCING PROTECTION CIRCUIT FOR AN ELECTRONIC BALLAST

CROSS-REFERENCES TO RELATED APPLICATIONS

This application claims benefit of the following patent application which is hereby incorporated by reference: U.S. Provisional Patent Application No. 61/177,564 filed May 12, 2009.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to circuitry for instant-start gas-discharge lamp ballasts. More particularly, the present invention relates to circuitry designed to overcome arcing problems associated with current-fed, parallel-resonant inverter topologies used in electronic ballasts.

The instant-start type of fluorescent lamp ballast has the advantage of fast starting. It is cost-effective and is particularly appropriate for long, continuous operation. A current-fed parallel-resonant inverter topology is known in the art as a particularly good solution for this kind of instant start application.

Referring to FIG. 1, an example of a typical topology for conventional dual lamp current-fed parallel-resonant circuits is shown. In this example, it may be understood by one of skill in the art that V_bus is typically provided at the output of a power factor control (PFC) circuit. Capacitors C1 and C2 may be large electrolytic components with C1 equal to C2. Q1 and Q2 are bipolar junction transistors (BJTs) that are used as switching components. D1 and D2 are free-wheeling diodes associated with transistors Q1 and Q2. Resonant capacitor C_Res and the primary winding of the main transformer T_Res_P form the main resonant tank.

In the load circuit 2 shown, two gas discharge lamps L1 and L2 are connected with the secondary winding of the main transformer T_Res_S through ballast capacitors C5 and C6.

Prior to starting, V_Bus charges capacitor C4 through resistive network R3 and R4. When the voltage across C4 reaches the breakdown voltage of the diac 3, diac 3 breaks down and looks like a short circuit so that the voltage on capacitor C4 turns on transistor Q2. After Q2 is turned on, the circuit begins to oscillate and the secondary winding of the main transformer T_Res_S, as well as windings T_Res_base_1, and T_Res_base_2 continue driving Q1 and Q2 such that the inverter reaches a steady state.

However, potential arcing within lamp-holders of instant-start type ballasts is a phenomenon that has been recognized as an undesirable effect to be mitigated. Such ballasts may have ignition voltages double or more that of a preheat type of ballast, and are therefore more conducive generally to potentially damaging arcing. Arcing may occur during re-lamping conditions where a gas discharge lamp is installed or replaced during live application of AC power. This form of arcing is relatively instantaneous and potentially undesirable. Arc detection should generally be suppressed during certain conditions such as normal startup or lamp ignition given the varying needs of gas discharge lamps. On the other hand, sustained arcing that occurs because of improper connections may be far more damaging and must be quickly and efficiently addressed.

It is therefore desirable that an arc protection circuit be designed for use with a fluorescent lamp using an instant-start type ballast.

It is further desirable that the circuit provide inverter shutdown capability for current-fed parallel-resonant inverter topologies with a predetermined time delay measured from lamp ignition and current conduction to prevent false or otherwise undesirable shutdowns.

It is further desirable that the circuit provide auto-restart capability for current-fed parallel-resonant inverter topologies with a predetermined time delay after disabling of the inverter.

BRIEF SUMMARY OF THE INVENTION

The present invention is a protection circuit for use with electronic ballasts using current-fed, parallel resonant inverters to drive one or more gas discharge lamps. More particularly, the present invention is a circuit operable to detect a rate of change in a signal across one or more lamps, monitor the signal for disturbances such as an arc, shut down the ballast if the arc is detected after a first time delay so as not to prematurely shut down the ballast in response to a transient signal that may occur during startup or re-lamping, and permit automatic restarting of the ballast via the self-oscillating parallel resonant inverter after the duration of a second time delay.

The arc protection circuit functions to promptly and effectively detect a potentially damaging arc in the signal across the one or more lamps and disable the ballast. The circuit begins detecting potential arcs upon at least one lamp igniting and beginning to conduct current, further functioning to prevent disabling of the ballast in response to undesirable triggers such as during startup or re-lamping conditions. The circuit is further desirable as being relatively inexpensive, easily implemented and having time delays that are adjustable to the needs of a user.

Briefly stated, an arc protection circuit for an electronic ballast is provided, the circuit including a lamp current rate of change sensing circuit coupled in series with a load circuit made up of one or more lamps. The sensing circuit is configured to detect lamp current provided after lamp ignition. A ballast shutdown circuit is coupled to the sensing circuit and is operable to disable the ballast in response to a disturbance such as an arc in the detected signal. A startup delay circuit is coupled to the sensing circuit and to the shutdown circuit. A least a portion of the startup delay circuit defines a first time delay from a predetermined condition during which the ballast can not be disabled by the shutdown circuit. An automatic restart circuit is coupled to the shutdown circuit and is operable to enable restarting of the ballast. At least a portion of the restart circuit defines a second time delay during which the ballast remains disabled, after which the ballast may be restarted.

In another embodiment of the present invention, a circuit is provided for shutting down an electronic ballast in response to an electrical disturbance such as an arc. The circuit includes a signal sensing device operable to detect a signal across one or more lamps powered by the ballast. The circuit includes first and second switching elements. Delay circuitry is coupled between the first switching element and the signal sensing device and includes a first capacitor having a charging time defining a first time delay during which the first switching element is turned off. Shutdown circuitry is coupled between the signal sensing device and the second switching element. The shutdown circuitry defines a threshold and is effective to turn on the second switching element when a disturbance that exceeds the threshold is detected after elapsing of the first time delay. The second switching element when turned on is arranged to disable the ballast.

In another embodiment of the present invention, an electronic ballast using a current-fed, parallel resonant inverter for powering one or more gas discharge lamps is provided. The ballast includes a lamp current rate of change sensing circuit operable to detect a current conducted across the one or more lamps. A starter delay circuit is operable to define a first predetermined time delay measured from a first detection of current by the sensing circuit. A ballast shutdown circuit is included and is operable to monitor the detected current for a disturbance and is further operable after elapsing of the first predetermined time delay to disable the ballast. An automatic restart delay circuit is operable to prevent restarting of the ballast during a second predetermined time delay measured from disabling of the ballast.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein may or may not refer to the same embodiment. The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa. The term "load" means one or more gas discharge lamps, electrical components, and/or any other devices that consume electric power during normal operation.

Referring generally to FIGS. 1-7 and the following detailed description, various embodiments of an arc protection circuit 10 are provided for an instant-start type electronic ballast having, for example, a current-fed, parallel resonant inverter capable of powering a load, such as one or more gas discharge lamps. The protection circuit 10 is capable of measuring a current across the load and detecting a disturbance such as an arc having a rate of change substantially in excess of normal operation. The circuit 10 is further capable of shutting down the ballast in response to the detected disturbance.

The circuit 10 is configured to prevent shutdown of the ballast during a predetermined time period defined by associated circuitry. The predetermined time period is preferably sufficient to permit normal startup of the ballast and lamp ignition but short enough to efficiently disable the ballast in response to a true and potentially damaging arc. In this way the ballast is protected from undesirable shutdowns that might result from transient signals common during, for example, startup or re-lamping conditions.

The circuit 10 is further capable of subsequently preventing a restart of the ballast for a second predetermined time period after the ballast has been shut down. After the second time period has elapsed, the ballast may automatically restart in embodiments such as shown including a self-oscillating inverter.

Figure 1:
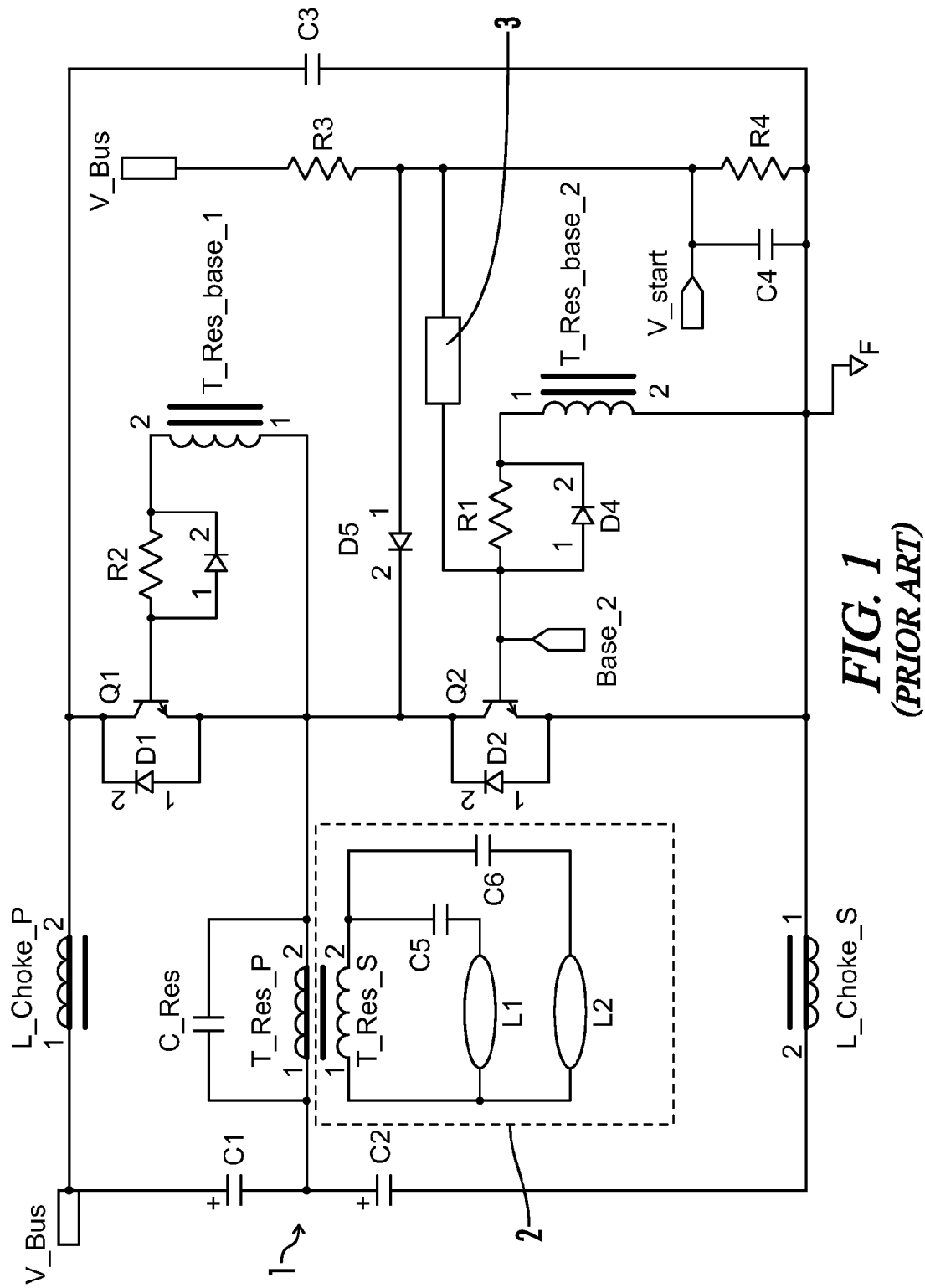
FIG. 1 is a schematic of a typical circuit topology for dual-lamp current-fed parallel-resonant circuit of the prior art.
Figure 2:
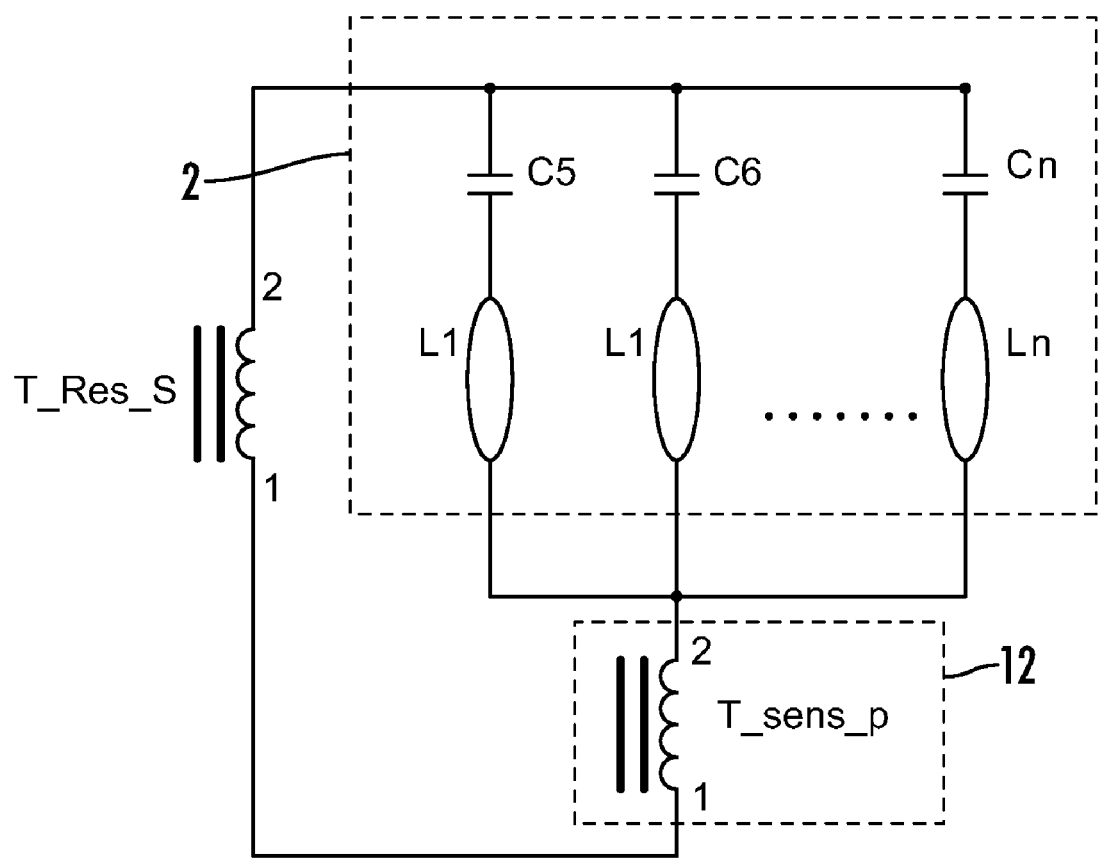
FIG. 2 is a schematic of a lamp current rate of change sensing circuit of an embodiment of the present invention coupled with the load circuit of FIG. 1.

Referring now to FIGS. 1-2, a load circuit 2 coupled to a typical current-fed, parallel resonant inverter ballast 1 is further coupled in series with a lamp current rate of change sensing circuit 12. The load circuit 2 as shown includes a plurality of lamps L1, L2 . . . Ln connected in parallel as shown. A first end of a primary winding of a current rate of change sensing transformer T_sens_p is coupled to a first end of the load circuit 2. A second end of the primary winding T_sens_p is coupled to a first end of the secondary winding of the resonant transformer T_res_s, with the second end of the resonant transformer T_res_s coupled to the second end of the load circuit 2.

Figure 6:
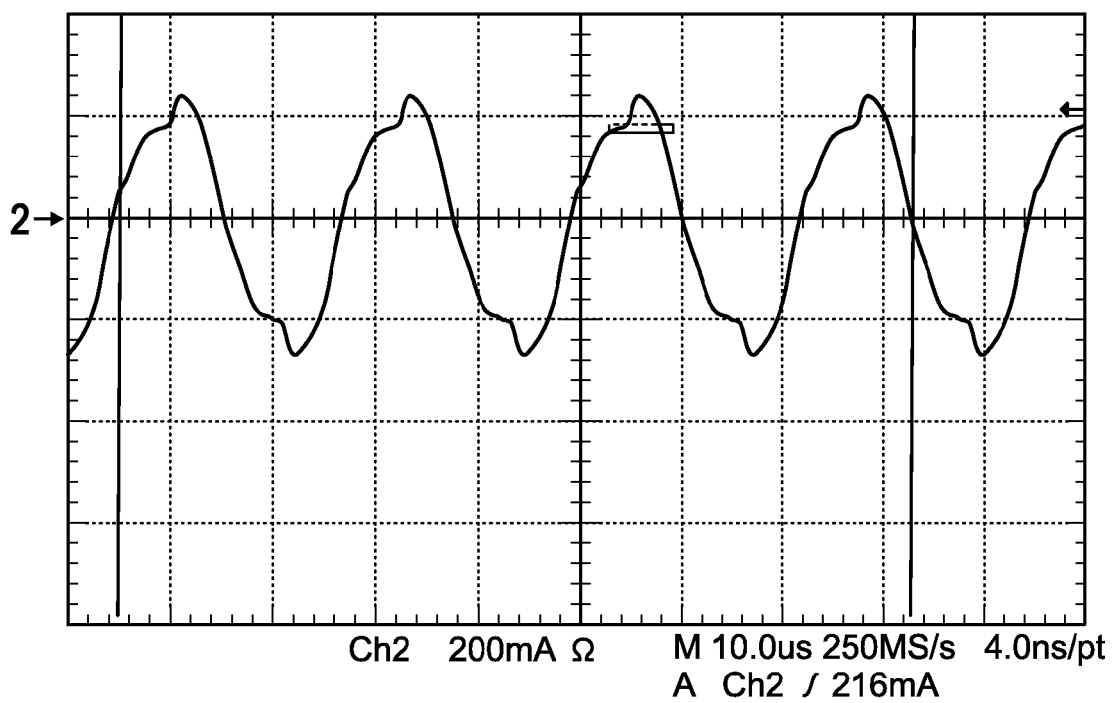
FIG. 6 is an x-y graphical display of a normal lamp current waveform.
Figure 7:
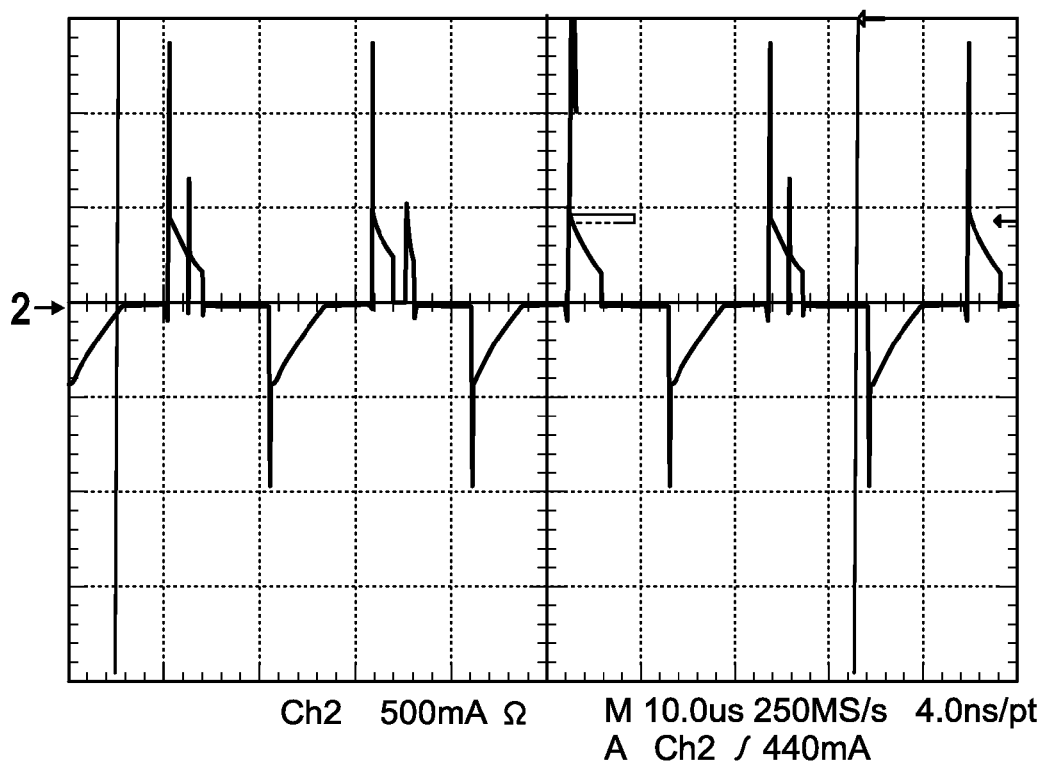
FIG. 7 is an x-y graphical display of a lamp current waveform with peak currents symptomatic of undesirable arcs.

Referring generally to FIGS. 2, 6 and 7, after ignition of one or more of the lamps, the lamp current passes through transformer T_sens. When arcing occurs, the lamp current waveform contains current peaks as shown in the waveform of FIG. 7 and has a very high current rate of change. This is a very distinct waveform from that of normal operation, as shown in FIG. 6. This high current rate of change di/dt can be transformed to a high transient voltage across the magnetic inductance of transformer T_sens. As a result, whenever arcing occurs the secondary winding of sensing transformer T_sens_s will also have a high voltage.

The sensing transformer T_sens in this embodiment is capable alone of sensing the current across the lamps L1, L2, although in other embodiments various additional or alternative components may be used to sense the current in manners known in the art.

Figure 3:
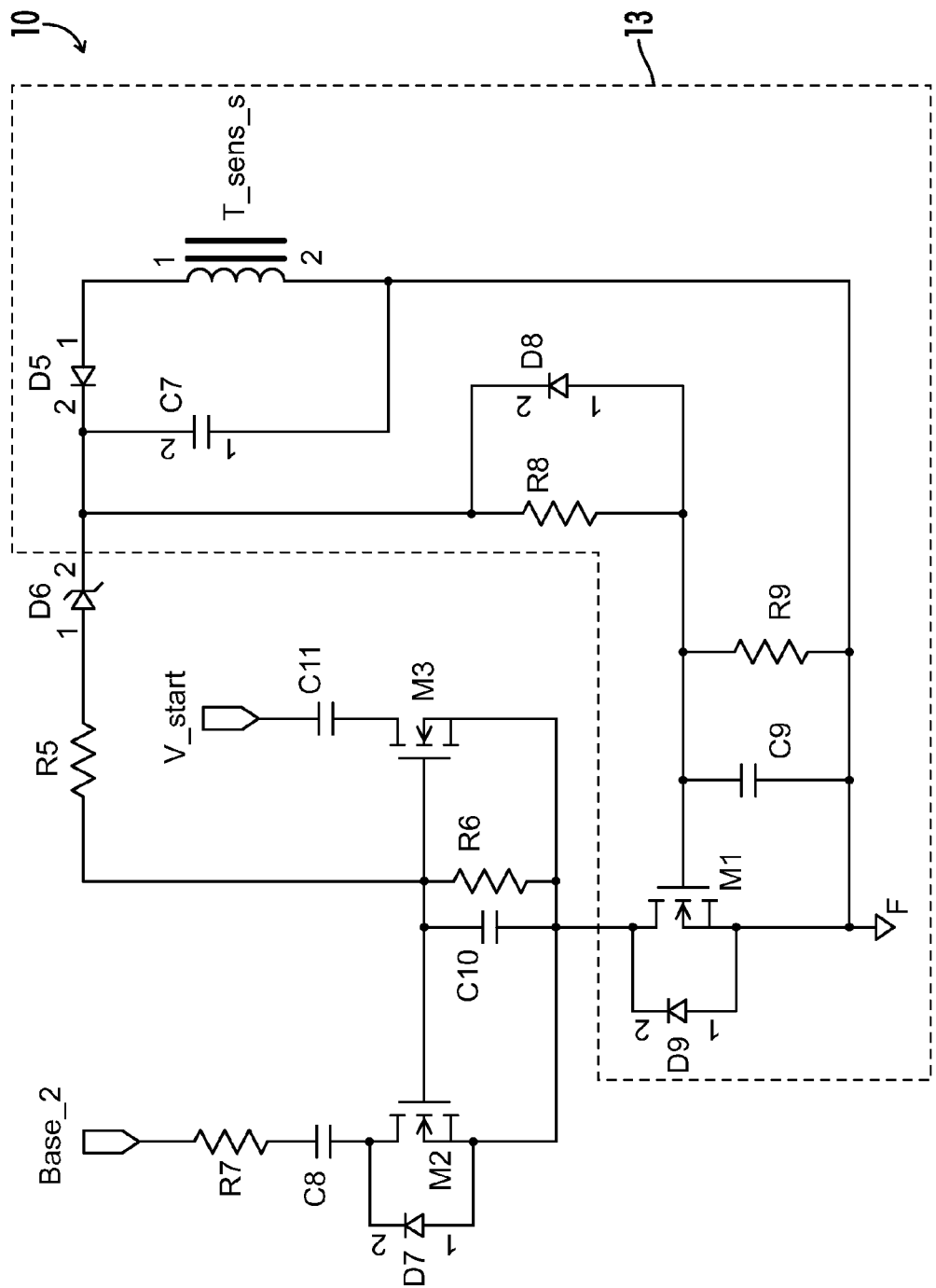
FIG. 3 is a schematic of an arc protection circuit of the present invention showing an embodiment of a startup delay circuit.

Referring now to FIG. 3, in an embodiment of the arc protection circuit 10, a startup delay circuit 13 is shown. The startup delay circuit 13 may be coupled to the lamp current rate of change sensing circuit 12 of FIG. 2 via a secondary winding of the sensing transformer T_sens_s. If there is no connected lamp in the load circuit 2, or no lamps that are currently ignited and conducting current, there will be no current through the transformer T_sens and thus no voltage across the transformer T_sens. If there are one or more conducting lamps in the load circuit 2 there will be a current through the transformer T_sens and an AC signal will appear across the primary winding T_sens_p and the secondary winding T_sens_s.

Delay circuitry including capacitors C7, C9, resistors R8, R9 and diodes D8, D5 is provided, wherein the diode D5 rectifies the AC signal across the secondary winding of the sensing transformer T_sens_s and a DC signal appears across the capacitor C7. The delay circuit 13 further includes a first switching element M1. In the embodiment shown, the first switching element M1 is a MOSFET M1 having a body diode D9. The gate and source of the MOSFET M1 are coupled to the delay circuitry, with the source further coupled to ground F.

After the one or more lamps L1 ... Ln start up, capacitor C9 will be slowly charged up to a threshold voltage of the first switching element M1. Before the voltage across the capacitor C9 reaches the turn-on threshold voltage of the first switching element M1, the first switching element M1 remains off. The charging time of the capacitor C9 in the embodiment shown defines a first time delay during which the first switching element M1 cannot be turned on. This first time delay is associated with any condition wherein current is first supplied to the sensing circuit 12 from the load circuit 2, such as for example an inverter startup or a re-lamping condition. The first time delay may encompass a portion of such conditions during which transient signals may be expected while the lamps approach steady state operation, and therefore prevent premature operation of the arc protection circuit 10 generally. In certain embodiments the charging time of the capacitor C9 may be selectable by a user as desired.

Figure 4:
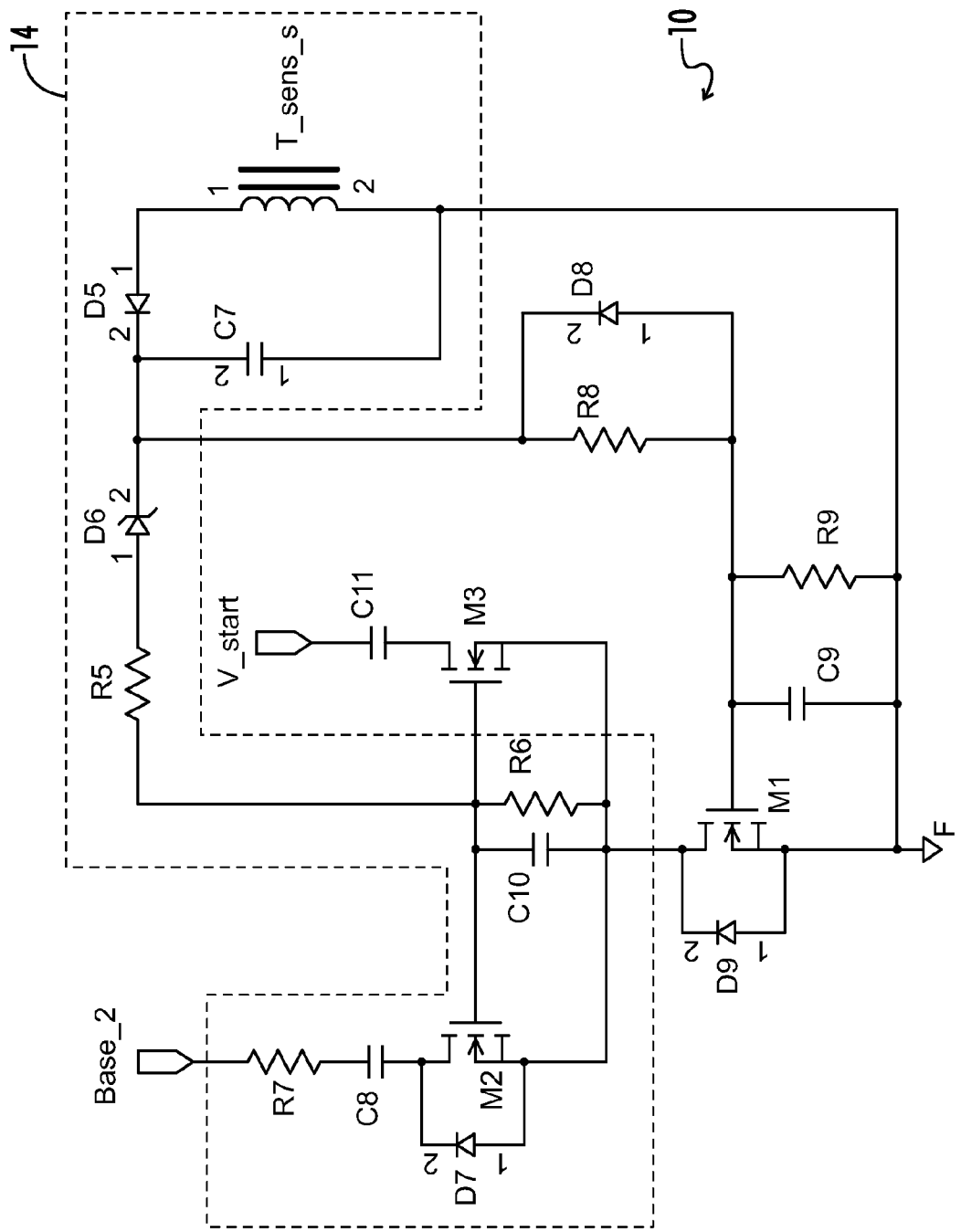
FIG. 4 is a schematic of an arc protection circuit of the present invention showing an embodiment of a ballast shutdown circuit.

Referring now to FIG. 4, in an embodiment of the arc protection circuit 10, a ballast shutdown circuit 14 is provided. The shutdown circuit 14 may also be coupled to the lamp current rate of change sensing circuit 12 of FIG. 2 via a secondary winding of the sensing transformer T_sens_s. Shutdown circuitry including capacitor C10, two resistors R5, R6 and Zener diode D6 are coupled to the secondary winding T_sens_s. A second switching element M2 or MOSFET M2 is coupled to the shutdown circuitry in parallel across its gate and source. The shutdown circuit 14 is coupled to the drain of first switching element M1. The second switching element M2 is thereby coupled to ground F through the first switching element M1 and its body diode D9.

In the embodiments as shown and previously described, when the first switching element M1 is turned off during the period of the first time delay, the second switching element M2, capacitor C10 and resistor R6 are thereby disconnected from ground and floating, as known in the art. The second switching element M2 is inoperable in this state and unable to turn on. After the voltage across capacitor C9 reaches the turn-on threshold voltage of the first switching element M1, or in other words after elapsing of the first predetermined time delay, the first switching element M1 is turned on and appears as a short circuit to ground F. As a result, the second switching element M2, capacitor C10 and resistor R6 are then connected to ground F and are no longer floating.

Referring now to FIGS. 1 and 3, diode D7 is the body diode of second switching element M2. During normal inverter operation the second switching element M2 is off and the capacitor C8 is peak charged by the base drive winding T_res_base_2 through resistor R7 and diodes D7, D9. The voltage across capacitor C8 in this case is negative with respect to ground F. If there is no arcing during normal operation, the voltage across C7 is smaller than the breakdown voltage of the Zener diode D6, and therefore there is no voltage across capacitor C10, second switching element M2 remains off, and the voltage across capacitor C8 remains negative with respect to ground F.

When arcing occurs across the one or more lamps L1 ... Ln, because of the high rate of change of the lamp current, a high voltage will appear across the primary winding of the sensing transformer T_sens_p and the secondary winding of the sensing transformer T_sens_s. Because of this high voltage, which is presumably higher than the breakdown voltage of Zener diode D6, capacitor C10 may quickly be charged above the turn-on threshold voltage of second switching element M2 through resistor R5 and Zener diode D6.

Capacitor C8 and resistor R7 are series-connected between second switching element M2 and the inverter driving the load, more particularly transistor Q2. As soon as second switching element M2 is turned on, the negative voltage previously across capacitor C8 will cross the base to the emitter of transistor Q2, forcing transistor Q2 to turn off. Turning off transistor Q2 will disable the self-oscillation of the inverter. The first time delay as previously described therefore works to prevent premature or undesired shutdown of the ballast during for example conditions such as startup or re-lamping where transient signals may be expected and do not warrant such action.

Figure 5:
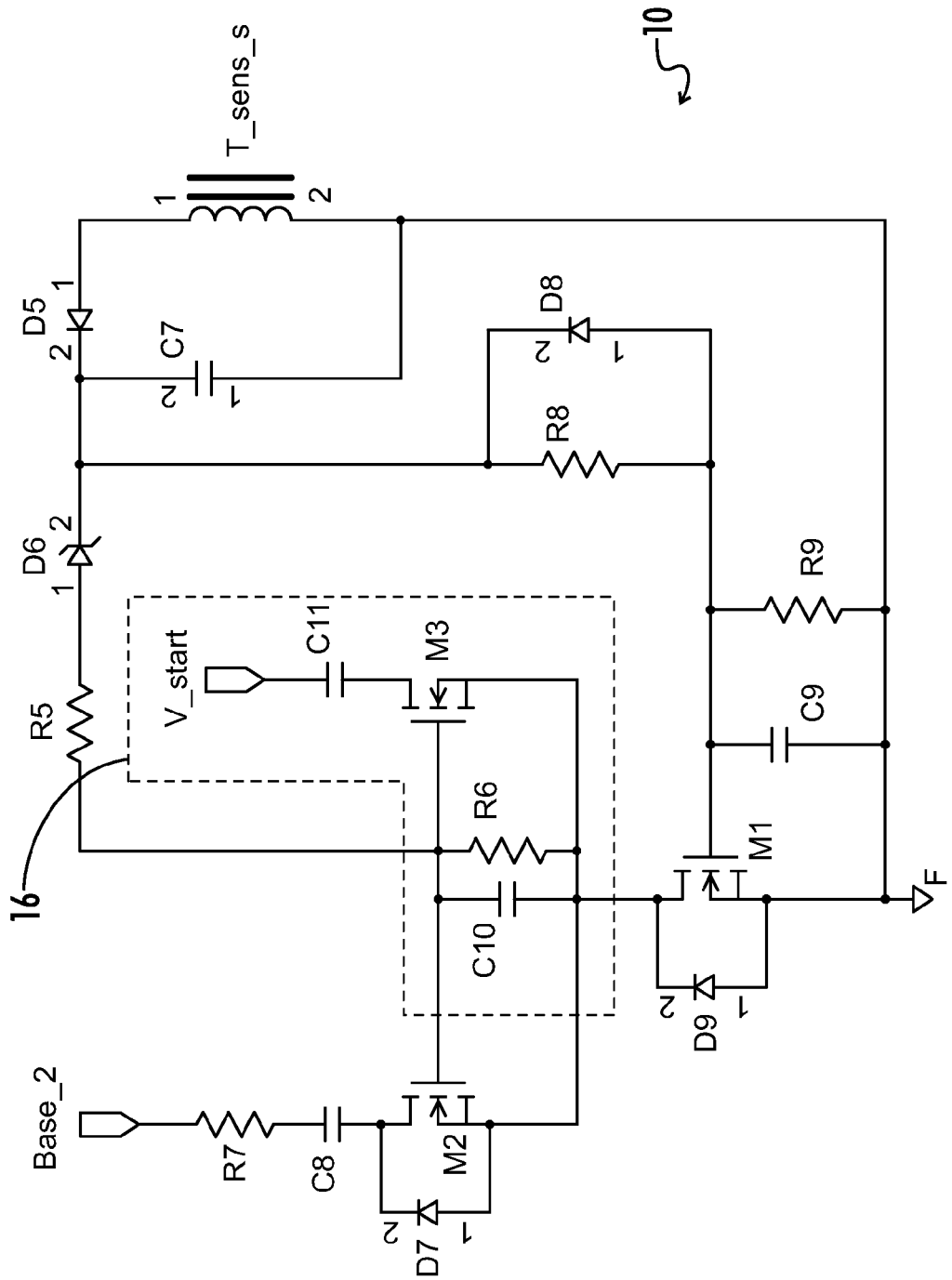
FIG. 5 is a schematic of the arc protection circuit of FIG. 3 showing an embodiment of a restart delay circuit.

Referring now to FIGS. 1 and 5, in an embodiment of the arc protection circuit 10 a restarting circuit 16 or automatic restarting delay circuit 16 is provided. The source of a third switching element M3 or MOSFET M3 is coupled to a portion of the shutdown circuit 14. The gate and source of third switching element or MOSFET M3 is coupled to resistor R6 that is further coupled to capacitor C10. The drain of third switching element M3 is coupled to capacitor C11, which is further coupled to terminal V_start.

In certain embodiments as shown, the third switching element M3 is, along with the second switching element M2, arranged to be floating during the first time delay while first switching element M1 is turned off. When first switching element M1 is turned on, the third switching element M3 is no longer floating. When an arc occurs across the lamps L1 ... Ln, and a voltage appears in the shutdown circuit 14 that is higher than the breakdown voltage of the Zener diode D6, this turns on second switching element M2, and the third switching element M3 is further turned on.

Turning on third switching element M3 further prevents the inverter from restarting after it has been disabled by the shutdown circuit 14. Because third switching element M3 is on, capacitor C11 is effectively in parallel with capacitor C4 (FIG. 1). The value of capacitor C11 may be designed to be large such that the recharging time of capacitors C11, C4 through resistors R3, R4 will be very long. As long as the voltage across capacitors C11, C4 does not reach the breakdown voltage of the diac 3, the inverter cannot be restarted.

Capacitor C10 may be selected to have sufficient capacitance to hold its charge for a relatively long time such that second and third switching elements M2, M3 remain on for a second predetermined time delay. When capacitor C10 has become discharged through resistor R6, second and third switching elements M2, M3 are then turned off. Once third switching element M3 is turned off, capacitor C11 is removed from the restarting circuit loop, and the inverter may as a result restart normally.

The inverter as shown in FIG. 1 is a self-oscillating inverter using a diac with a breakdown voltage as known in the art, but it may be understood that various other methods of restarting the inverter oscillation after elapsing of the second time delay, either automatically or as driven in response to a programmed startup signal for example, may be possible within the scope of the present invention.

It may be further understood that in various embodiments as shown in FIG. 5 and previously described, the second time delay corresponds to the discharge time of the capacitor C10 and may be selectably changed by varying the values of capacitor C10 and resistor R6. In this manner the second time delay may for example be desirably selected, designed and implemented in accordance with user requirements.

The previous detailed description has been provided for the purposes of illustration and description. Thus, although there have been described particular embodiments of the present invention of a new and useful "Anti-Arcing Protection Circuit for an Electronic Ballast," it is not intended that such references be construed as limitations upon the scope of this invention except as set forth in the following claims.

What is claimed is:

1. An arc protection circuit for an electronic ballast comprising:
   a lamp current rate of change sensing circuit coupled in series with a load circuit comprising one or more lamps, the sensing circuit configured to detect a lamp current signal;
   a ballast shutdown circuit coupled to the sensing circuit and operable to disable the ballast in response to a disturbance in the detected lamp current signal;
   a startup delay circuit coupled to the sensing circuit and to the shutdown circuit, at least a portion of the startup delay circuit defining a first time delay from a predetermined condition during which the ballast cannot be disabled by the shutdown circuit; and
   an automatic restart circuit coupled to the shutdown circuit and operable to enable restarting of the ballast, at least a portion of the restart circuit defining a second time delay during which the ballast remains disabled, after which the ballast is restarted.

2. The circuit of claim 1, the lamp current rate of change sensing circuit further comprising a primary winding of a current rate of change sensing transformer coupled in series with a load circuit comprising one or more lamps connected in parallel.

3. The circuit of claim 2, the shutdown circuit further comprising a secondary winding of the current rate of change sensing transformer, wherein a signal corresponding to a total current through the lamps is received by the shutdown circuit.

4. The circuit of claim 1, the startup delay circuit further comprising
   a first switching element having a threshold voltage;
   delay circuitry coupled between the lamp current rate of change sensing circuit and the first switching element, said circuitry effective to transform the signal detected by the sensing circuit to a DC signal, said DC signal capable of driving the first switching element after the first time delay has elapsed.

5. The circuit of claim 4, the delay circuitry comprising a first capacitor, a charging time of the first capacitor selectable to define the first time delay.

6. The circuit of claim 4, the ballast shutdown circuit further comprising
   a second switching element having a threshold voltage;
   shutdown circuitry coupled between the lamp current rate of change sensing circuit and the first switching element, the shutdown circuitry comprising a Zener diode having a breakdown voltage larger than the threshold voltage of the second switching element;
   the shutdown circuitry further effective to transform the signal detected by the sensing circuit to a DC signal driving the switching element when said DC signal exceeds the breakdown voltage of the diode; and
   the second switching element when turned on arranged to disable the ballast.

7. The circuit of claim 6, the second switching element coupled to ground through the first switching element, wherein the second switching element is inoperable when the first switching element is turned off, and
   wherein the shutdown circuit is operable to disable the ballast when the DC signal exceeds the breakdown voltage of the Zener diode after the first time delay has elapsed.

8. The circuit of claim 6, the automatic restart circuit further comprising
   a third switching element coupled to the shutdown circuit and arranged to be turned on in association with the second switching element;
   a second capacitor coupled to the third switching element, the charging time of the second capacitor effective to prevent startup while the third switching element is on; and
   a third capacitor and a resistor coupled in parallel and selectable to define the second time delay.

9. The circuit of claim 8, the third capacitor and the resistor further coupled to the second and third switching elements wherein discharge of the third capacitor turns off the second and third switching elements and enables restarting of the ballast.

10. A circuit for shutting down an electronic ballast in response to an electrical disturbance, the circuit comprising:
    a signal sensing device operable to detect a signal across one or more lamps powered by the ballast;
    a first switching element;
    a second switching element;
    delay circuitry coupled between the first switching element and the signal sensing device, the delay circuitry further comprising a first capacitor having a charging time, the charging time of the first capacitor defining a first time delay during which the first switching element is turned off; and
    shutdown circuitry coupled between the signal sensing device and the second switching element, the shutdown circuitry defining a threshold and effective to turn on the second switching element when a disturbance that exceeds the threshold is detected after elapsing of the first time delay,
    the second switching element when turned on is arranged to disable the ballast.

11. The circuit of claim 10, the shutdown circuitry further effective to transform the signal detected by the signal sensing device to a DC signal, the shutdown circuitry further comprising a Zener diode having a breakdown voltage, the second switching element arranged to disable the ballast when the DC signal exceeds the breakdown voltage of the Zener diode after the first time delay has elapsed.

12. The circuit of claim 10, the second switching element connected to ground through the first switching element,
    wherein the second switching element is inoperable when the first switching element is turned off, and
    wherein the second switching element is operable to disable the ballast when the first switching element is turned on.

13. The circuit of claim 12, further comprising:
    a third switching element coupled to the second switching element and arranged to be turned on in association with the second switching element;
    a second capacitor coupled to the third switching element and having a charging time, the second capacitor effective to prevent startup while the third switching element is on; and
    a third capacitor and a resistor coupled in parallel and selectable to define a second time delay between disabling of the ballast and restarting of the ballast.

14. The circuit of claim 13, the third capacitor and the resistor further coupled to the second and third switching elements wherein discharge of the third capacitor turns off the second and third switching elements and enables restarting of the ballast.

15. The circuit of claim 13, the first, second and third switching elements comprising MOSFETs.

16. The circuit of claim 10, the signal sensing device comprising a signal sensing transformer having a primary winding coupled across the one or more lamps and a secondary winding coupled to the shutdown circuitry and the delay circuitry.

17. An electronic ballast comprising a current-fed, parallel resonant inverter for powering one or more gas discharge lamps, the ballast further comprising:
  a lamp current rate of change sensing circuit operable to detect a current across the one or more lamps;
  a starter delay circuit operable to define a first predetermined time delay measured from a first detection of current by the sensing circuit;
  a ballast shutdown circuit operable to monitor the detected current for a disturbance and further operable after elapsing of the first predetermined time delay to disable the ballast; and
  an automatic restarting delay circuit operable to prevent restarting of the ballast during a second predetermined time delay measured from disabling of the ballast.

18. The ballast of claim 17, the lamp current rate of change sensing circuit comprising a transformer having a primary winding coupled to the one or more lamps and a secondary winding coupled to the starter delay circuit and the ballast shutdown circuit.

19. The ballast of claim 17, the shutdown circuit further comprising:
  a first capacitor coupled to the sensing circuit and further coupled in parallel to a gate and source of a first MOSFET; and
  a second MOSFET coupled to the first MOSFET and further coupled to the inverter, the second MOSFET inoperable when the first MOSFET is turned off,
  the starter delay circuit operable to turn on the first MOSFET after a charging time of the first capacitor,
  the ballast shutdown circuit further arranged to disable oscillation of the inverter when the second MOSFET is turned on,
  the capacitor charging time selectable in association with the first predetermined time delay.

20. The ballast of claim 19, the automatic restart circuit further comprising:
  a third MOSFET arranged to be turned on in association with the second MOSFET;
  a second capacitor coupled to the third MOSFET and having a charging time, the second capacitor effective to prevent startup while the third MOSFET is on; and
  a third capacitor and a resistor coupled in parallel and further coupled to the gates and sources of the second and third MOSFETs, the third capacitor and the resistor selectable to define the second time delay between disabling of the ballast and restarting of the ballast, wherein discharge of the third capacitor turns off the second and third switching elements and enables restarting of the ballast.

* * * * *